United States Patent [19]
Boyer

[11] 3,732,402
[45] May 8, 1973

[54] ELECTROMECHANICAL DEVICE FOR TAPE WINDING MECHANISM

[75] Inventor: Marcel-Louis Boyer, Chatillon, France

[73] Assignee: Compagnie Industrielle des Telecommunications Cit-alcatel, Paris, France

[22] Filed: May 30, 1972

[21] Appl. No.: 257,900

Related U.S. Application Data

[63] Continuation-in-part of Ser. No. 136,496, April 22, 1971.

[30] Foreign Application Priority Data

May 26, 1971 France..........................7119073

[52] U.S. Cl.............................235/61.11 R, 226/195
[51] Int. Cl.........................G06k 13/26, B65h 23/08
[58] Field of Search................235/61.11 R, 61.11 E, 235/61.11 D; 340/259; 226/29, 42, 33, 48, 128, 195; 242/55.12, 55.14, 75, 75.44, 190; 317/123

[56] References Cited

UNITED STATES PATENTS

| | | | |
|---|---|---|---|
| 3,389,399 | 6/1968 | Kennedy | 226/42 |
| 2,941,124 | 6/1960 | Gams et al. | 340/259 |
| 3,294,331 | 12/1966 | Wang et al. | 226/195 |
| 3,384,281 | 5/1968 | Mason | 226/195 |
| 3,517,895 | 6/1970 | Kraft | 226/195 |
| 3,525,480 | 8/1970 | Willard | 226/195 |

*Primary Examiner*—Daryl W. Cook
*Attorney*—Paul M. Craig, Jr. et al.

[57] ABSTRACT

An electromechanical device for a tape winding mechanism which adapts the step-by-step advance at very high speed and at low inertia to the control of the winding and unwinding spools which have a great inertia, in the case where the band must be periodically stopped for an instant, including lightweight pulley arrangements responsive to starting and stopping operations for automatically providing the required slack in the tape to overcome the difficulties created by the high inertia of the spools and wherein vibrations in the pulley arrangements are reduced to the maximum possible extent by the provision of pairs of coil spring members connected between the actuating solenoids and the pivot arms for the pulleys so that the required slack in the tape can be provided at high speed without harmful vibration.

9 Claims, 1 Drawing Figure

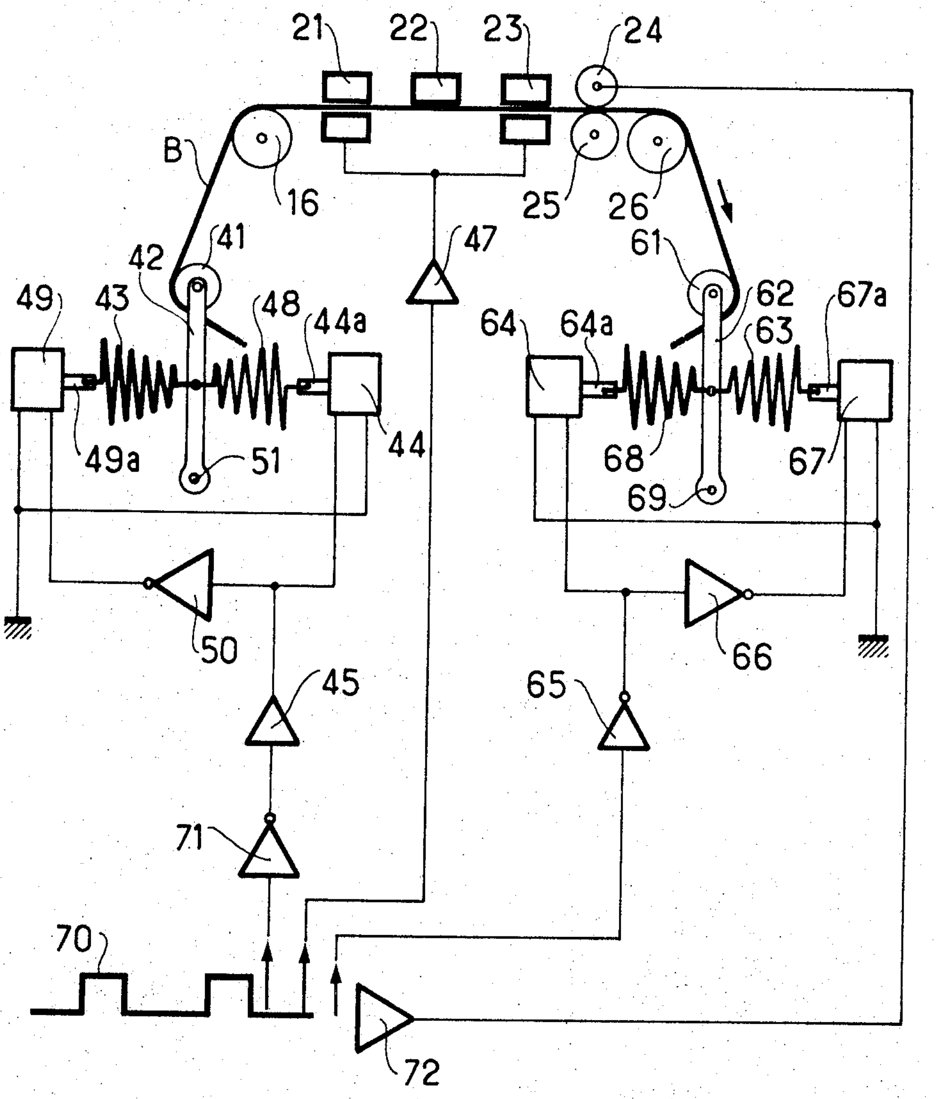
21
22
23
24
B
16
25
26
41
42
47
61
62
49
43
48
44a
64
64a
63
67a
49a
51
44
68
67
69
50
66
45
65
71
70
72

ELECTROMECHANICAL DEVICE FOR TAPE WINDING MECHANISM

This is a continuation-in-part of my copending application Ser. No. 136,496, filed Apr. 22, 1971.

The present invention is directed to the field of very high speed punch tape readers, operating, for example, at a speed in the order of a thousand characters per second, that is, operating at a rate of a thousand spaces and stops per second. It concerns an improvement to the electromechanical device enabling the very high speed low inertia step-by-step tape advance to be adapted to the control of the high inertia tape take-up and fed spools, in the case where the tape must be stopped for a longer instant. One application of the invention relates to data transmission.

The parent application Ser. No. 136,496 concerns a device enabling the intermittent movement of a punched tape at very high speed, for example 2.54 m/s per thousand steps per second each being 2.54 mm in length, provided with elements giving the tape the necessary slack for starting, or in the case of a rather long stop, for example, 10 or so milliseconds, the slack required for the processing of data. In these two cases, as the inertia of the spools does not allow these spools to change in speed at a rate of a millisecond, or even at a rate of ten or so milliseconds, the result would inevitably be the breaking of the tape, if an appropriate device did not provide adequate slack for the tape.

The tape is driven by a capstan, and braked by a brake shoe device. This step-by-step advance is controlled by an advancing signal having a rectangular form, with two logic values; for example, logic value 1 produces drive by the capstan and logic value 0 produces braking.

At the output of the capstan, on the take-up spool side, the configuration according to the parent application provides for an ultralight roller positioned next to a fixed guide pulley and fitted on an ultra-light arm pivoting about a fixed point, which arm is held in the normal position by a return spring, and can be inclined, giving the tape some slack, under the control of an electromagnet. Another identical device is placed on the feed spool side. The assembly is thus completely symmetrical.

On one side as on the other, under the effect of the logic signal, the ultra-light device is inclined under the control of its electromagnet in the direction required for giving the tape enough slack to avoid the breaking thereof. In the normal advancing state of the tape, that is, intermittent at high speed, the two ultra-light shafts undergo a slight vibration.

With a view to obtaining, with complete security, operation at even higher speed, the present invention provides arrangements concerning the drive device for the two ultra-light shafts each bearing an ultra-light roller.

It is known that the maximum operating speed for devices of this kind is limited by the resonant frequency thereof. The aim of the present invention is, in relation to the configuration according to the parent application, on the one hand, to raise the resonant frequency of the slack producing arrangement, and, on the other hand, to dilute the effects thereof.

It is known that the force acting on such a system comprises three components: an inertia component, a friction component, and a flexibility component. Its expression has the form:

$$u = m\,(d^2x/dt^2) + (dk/dt) + sx \qquad (1)$$

$x$ designating elongation and $t$ representing time. It is known that such a system has a resonant frequency designated by $$F = (1/2\pi)\sqrt{(s/m) - (k^2/4m^2)} \qquad (2)$$

The arrangements provided in accordance with the present invention have the effect of decreasing the parameter $m$ (mass) and of replacing the term $sx$ by a more complex non-linear term.

The principles of the invention will be more fully disclosed with reference to the accompanying drawing, which is a schematic diagram of one exemplary embodiment of the invention and in which the elements common with the configuration according to the parent application have the same reference designations as used in that application.

The tape B, moving in the direction of the arrow, passes under two braking shoes 21 and 23, controlled by the output of an amplifier 47. Between the two braking shoes a reading head 22 is placed. The tape is driven by a capstan pulley 24 pressing the tape B against a counter-pulley 25. The guide pulleys 16 and 26 direct the tape towards the ultra-light rollers 41 and 61, respectively.

A feed spool for the tape provided with a shock-absorber and tensioning device, including a pivot arm mounted on the spool and one or more associated rollers, is placed upstream from the roller 41. A tape take-up spool for the tape, provided with an identical shock-absorber and tensioning device, is placed downstream from the roller 61. These two devices along with the associated feed and take-up spools, which have been described and analyzed in detail in the parent application, are now shown.

The roller 41 is fitted on the ultra-light arm 42, which can pivot about a fixed point 51. The arm 42 is connected to the ends of two springs 43 and 48. The other end of the spring 43 is connected to a magnetic core **49*a*, which can be inserted in a magnetic circuit 49. The other end of the spring 48 is connected to a magnetic core 44*a*, which can be inserted in a magnetic circuit 44**.

Likewise, the ultra-light roller 61 is fitted on the ultra-light arm 62 which can pivot about a fixed point 69, and is connected to the ends of two springs 63 and 68. The other end of the spring 63 is connected to a magnetic core **67*a* which can be inserted in a magnetic circuit 67. The other end of the spring 68 is connected to a magnetic core 64*a* which can be inserted in a magnetic circuit 64**.

An advance/braking signal 70 is applied, on the one hand, for advance of the tape to the capstan 24 through an amplifier 72 and inverter 73; and, on the other hand, the signal 70 is applied to the brakes 21 and 23 through an amplifier 47. It is also applied to the magnetic circuit 64 by way of an inverter 65 and further to the magnetic circuit 67 by way of an additional inverter 66. The same signal 70 is applied through an inverter 71 and an amplifier 45 to the magnetic circuit 44 and is also applied through another inverter 50 to the magnetic circuit 49.

In the above equations (1) and (2), the parameter $m$ is the sum of two quantities:

$$m1 = \text{mass of roller} + \text{arm}$$

$$m2 = \text{mass of the plunger core}$$

With the differential configuration adopted, each of the two plunger cores 44$a$, 49$a$, or 64$a$, 67$a$ can be much lighter than in the previously described case, where the arm is operated by a single electromagnet acting in opposition to a single relatively strong spring. As in the pivoting in one direction or the other, there is always a single plunger core in motion, this reduction of the mass in motion has the effect of raising the resonant frequency of the arrangement to a higher value.

Moreover, to great advantage, the springs 43, 48, 63 and 68 will be in the form of coil springs, though not cylindrical springs, but coil springs having a progressive form, whose coils have a diameter increasing from the arm towards the plunger, such as that which is shown schematically in the FIGURE, that is, either in linear progression or in exponential progression. The advantage is that, in the equation (2), the term $s$ is no longer constant, but varies with the elongation $x$. That variation of the parameter $s$ with the elongation has the effect of replacing a sharp summit of the resonance curve by a rounded maximum.

An analogous effect is obtained due to the fact that the supporting point of each of these springs is not fixed, but moves under the effect of the action of the plunger cores.

Lastly, the two springs acting on an arm, that is, springs 43 and 48 for the arm 42, and springs 63 and 68 for the arm 62, are not identical. A greater coefficient of flexibility, for example, between 1.5 and 3 times greater than the coefficient of flexibility of the spring 43, 63 placed on the outside will preferably be provided for the spring placed on the inside, that is, for springs 48 and 68. The inside spring having a greater return pull, the preferred stop position is that which corresponds to release, with the tape loose, this constituting an extra safety measure against the breaking of the tape on starting.

For the non-energized magnetic circuit (zero exciting current), the residual magnetism of the magnetic circuit ensures residual friction of the variable supports. Possibly, if the return pull and friction force are insufficient to ensure the required holding of the cores 44$a$, 49$a$ and 67$a$, a low rest current (for example, a few milliamperes) will be made to pass in the corresponding field magnets.

What is claimed is:

1. In a high-speed band reader, for example, for a perforated paper band, performing an immobile reading process at high speeds, including an unwinding spool carrying said band and a winding spool for receiving said band from said unwinding spool, driving means for driving said band between said spools, reading means for reading data on said band and braking means for stopping said band periodically in response to an applied braking signal to enable reading of said data by said reading means, the improvement comprising compensating means responsive to said braking means for introducing slack in said band to overcome the inertia effects of said speed during times of an abrupt change of speed of said band including at least one ultra-light pulley over which said band passes, an ultra-light pivot arm having said pulley mounted thereon, a pair of elastic elements connected to said pivot arm and extending in opposite directions therefrom and deflection means connected to at least one elastic element for deflecting said pulley away from said band during intervals between operation of said braking means.

2. A high-speed band reader as defined in claim 1 wherein said elastic elements are coil springs.

3. A high-speed band reader as defined in claim 2 wherein said coil springs each have a diameter which increases from the end thereof connected to said pivot arm to the other end thereof.

4. A high-speed band reader as defined in claim 3 wherein the diameter of each of said coil springs increases linearly.

5. A high-speed band reader as defined in claim 3 wherein the diameter of each of said coil springs increases exponentially.

6. A high-speed band reader as defined in claim 2 wherein one of said coil springs connected to said pivot arm has a greater flexibility than the other.

7. A high-speed band reader as defined in claim 1 wherein said deflecting means includes a pair of solenoid actuators each having a plunger core connected to the end of a respective one of said elastic elements and means providing complementary logic signals to said respective solenoid actuators for displacing said plunger cores in opposite directions.

8. A high-speed band reader as defined in claim 1 wherein said compensating means includes a pair of ultra-light pulleys over which said band passes, each pulley being connected to a respective ultra-light pivot arm, said pulleys being disposed between said reading means and said winding and unwinding spools, respectively, each pivot arm being connected to a respective pair of elastic elements and to respective deflection means.

9. A high-speed band reader as defined in claim 8 wherein said deflecting means includes a pair of solenoid actuators each having a plunger core connected to the end of a respective one of said elastic elements and means providing complementary logic signals to said respective solenoid actuators for displacing said plunger cores in opposite directions.

* * * * *